(12) United States Patent
LaJoie

(10) Patent No.: US 9,945,502 B1
(45) Date of Patent: Apr. 17, 2018

(54) COUPLER HAVING HAMMER EARS

(71) Applicant: Jocelyne LaJoie, Elmont, NY (US)

(72) Inventor: Jocelyne LaJoie, Elmont, NY (US)

(*) Notice: Subject to any disclaimer, the term of this patent is extended or adjusted under 35 U.S.C. 154(b) by 336 days.

(21) Appl. No.: 14/721,350

(22) Filed: May 26, 2015

(51) Int. Cl.
F16L 37/00 (2006.01)
F16L 37/12 (2006.01)
F16L 23/036 (2006.01)

(52) U.S. Cl.
CPC .......... F16L 37/1205 (2013.01); F16L 23/036 (2013.01)

(58) Field of Classification Search
CPC ............................ F16L 37/1205; F16L 23/036
USPC ......................... 285/406, 312, 314, 315, 320
See application file for complete search history.

(56) References Cited

U.S. PATENT DOCUMENTS

| 554,666 | A | | 2/1896 | Feltner | |
| 4,222,593 | A | | 9/1980 | Lauffenburger | |
| 5,295,717 | A | * | 3/1994 | Chen | F16L 37/18 285/312 |
| 5,338,069 | A | * | 8/1994 | McCarthy | F16L 37/18 285/312 |
| 5,722,697 | A | * | 3/1998 | Chen | F16L 37/18 285/276 |
| 5,911,445 | A | | 6/1999 | Lee | |
| 6,224,113 | B1 | | 5/2001 | Chien | |
| 6,364,369 | B2 | * | 4/2002 | Bailey | F16L 37/18 285/312 |
| 8,240,718 | B2 | * | 8/2012 | Morton | F16L 23/036 285/312 |
| 2004/0262918 | A1 | * | 12/2004 | Janis | F16L 37/127 285/320 |

FOREIGN PATENT DOCUMENTS

| EP | 1143188 | 10/2003 |
| EP | 1521029 | 4/2005 |

* cited by examiner

Primary Examiner — Aaron M Dunwoody
Assistant Examiner — Fannie C Kee

(57) ABSTRACT

The coupling having hammer ears is a cam and groove coupling wherein the female portion of the coupling is fitted with a collar formed with hammer ears that provide a location designed to safely receive hammer blows without otherwise damaging the cam and groove coupling. The coupling having hammer ears includes the female connection of a cam and groove coupling and a collar.

7 Claims, 3 Drawing Sheets

COUPLER HAVING HAMMER EARS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

The present invention relates to the field of hose connections and flexible pipe couplings, more specifically, a hose coupling configured for use with hammers.

Tanker trucks, whether carrying potable liquids, fuel, waste water, or bulk materials, have to be connected to piping systems in order to be effective. Connections to a piping system typically call a hose fitted with a cam and groove coupling. When new, cam and groove couplings provide a leak-proof seal that is easy to use. However, with age and repeated use the cam and groove couplings become less reliable and more difficult to use. To compensate for this, some users of cam and groove couplings have taken to using hammers to insure the secure connection of the cam and groove couplings. While this techniques does produce immediate benefits, the disadvantage of this techniques is that it further damages the cam and groove fitting making future couplings more problematic.

SUMMARY OF INVENTION

The above problem is the addressed by this disclosure. The coupling having hammer ears is a cam and groove coupling wherein the female portion of the coupling is fitted with a collar formed with hammer ears that provide a location designed to safely receive hammer blows without otherwise damaging the cam and groove coupling.

These together with additional objects, features and advantages of the coupling having hammer ears will be readily apparent to those of ordinary skill in the art upon reading the following detailed description of the presently preferred, but nonetheless illustrative, embodiments when taken in conjunction with the accompanying drawings.

In this respect, before explaining the current embodiments of the coupling having hammer ears in detail, it is to be understood that the coupling having hammer ears is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the coupling having hammer ears.

It is therefore important that the claims be regarded as including such equivalent construction insofar as they do not depart from the spirit and scope of the coupling having hammer ears. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
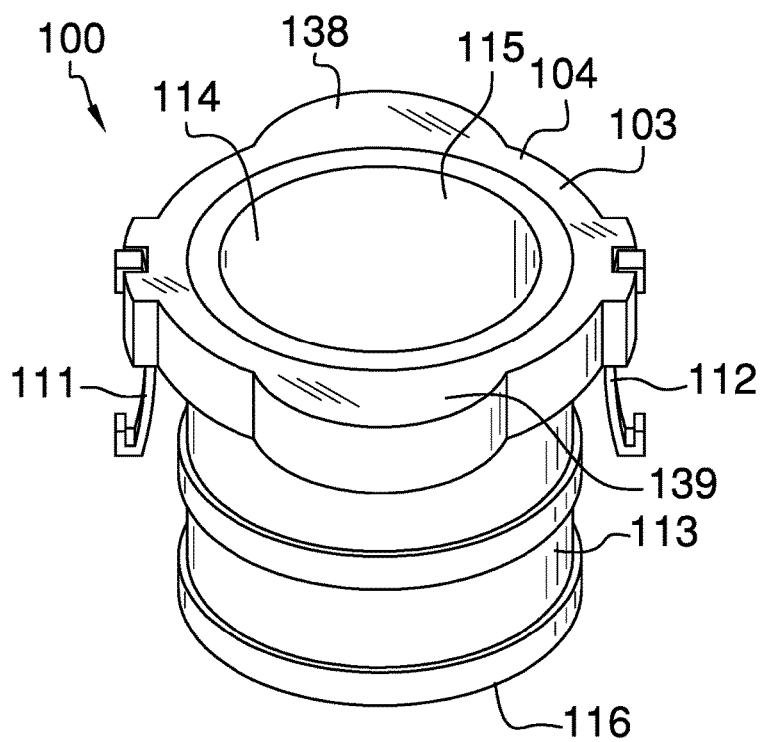
FIG. 1 is a perspective view of an embodiment of the disclosure.
Figure 2:
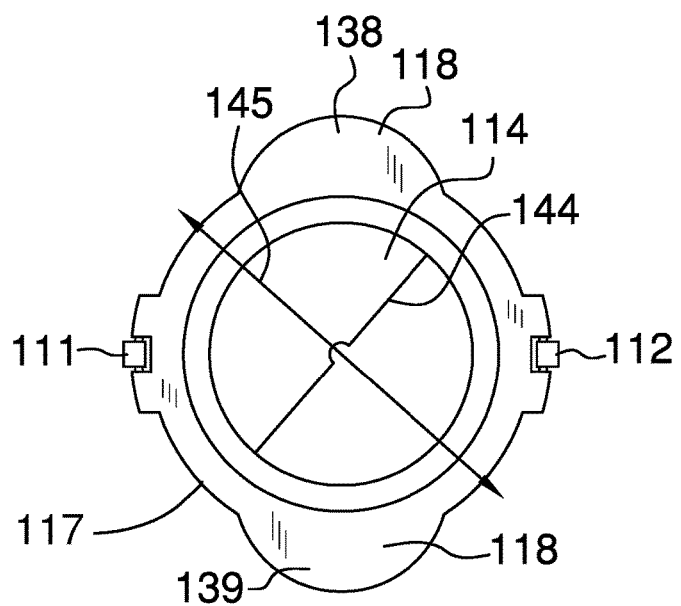
FIG. 2 is a top view of an embodiment of the disclosure.
Figure 3:
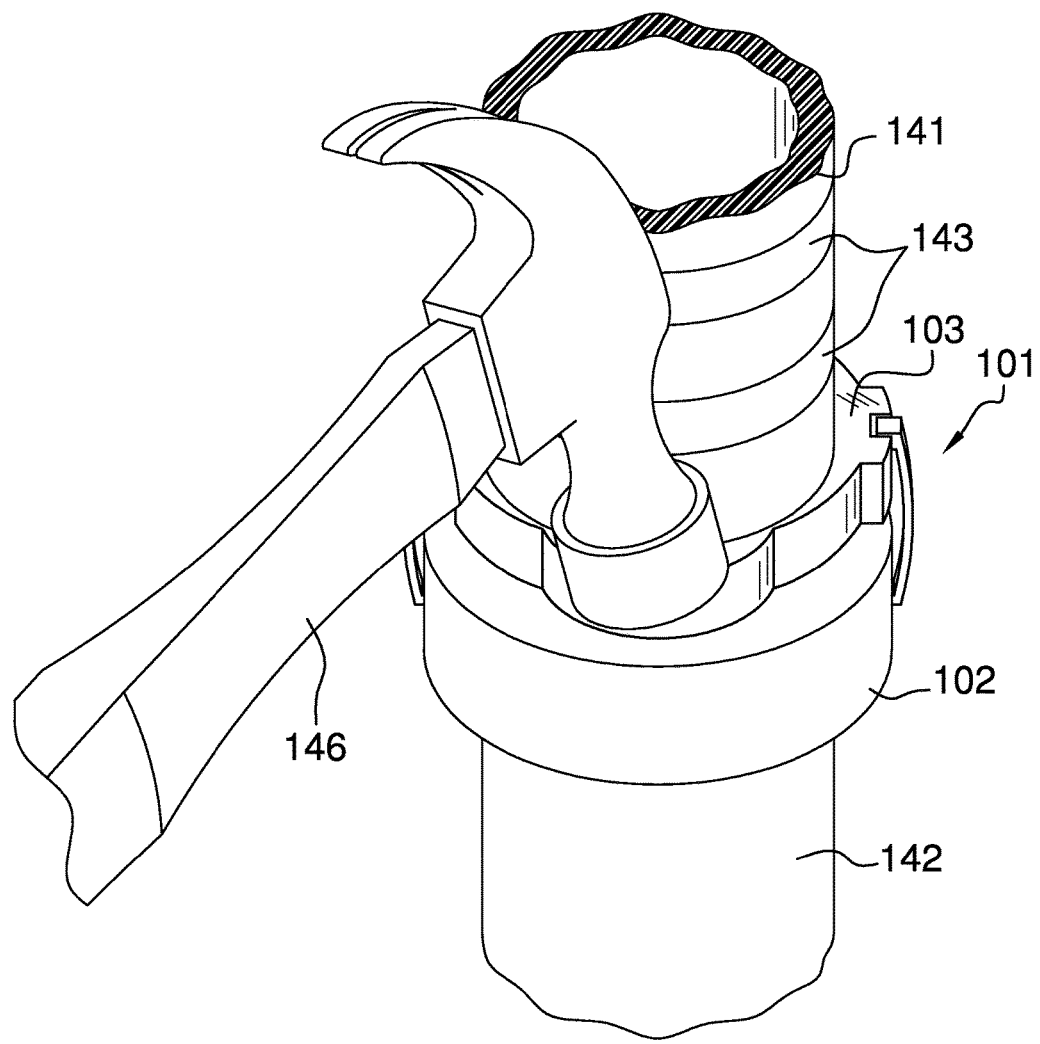
FIG. 3 is an in use view of an embodiment of the disclosure.
Figure 4:
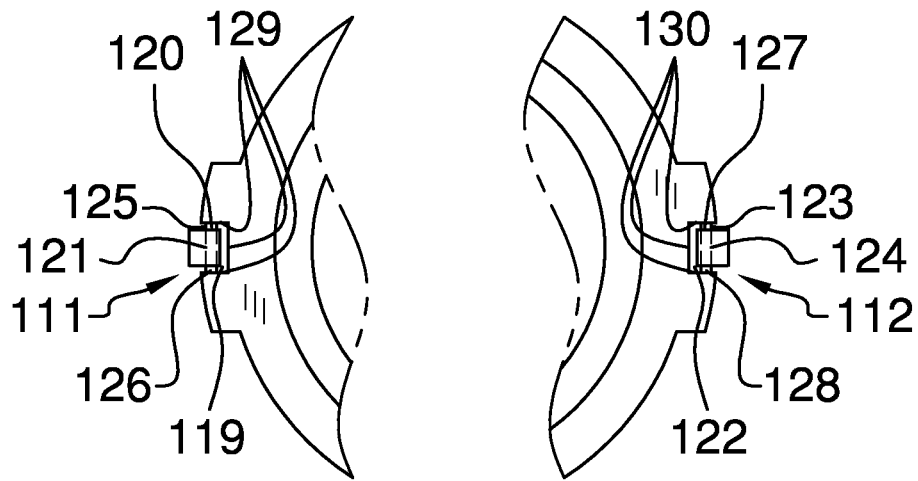
FIG. 4 is a detail view of an embodiment of the disclosure.
Figure 5:
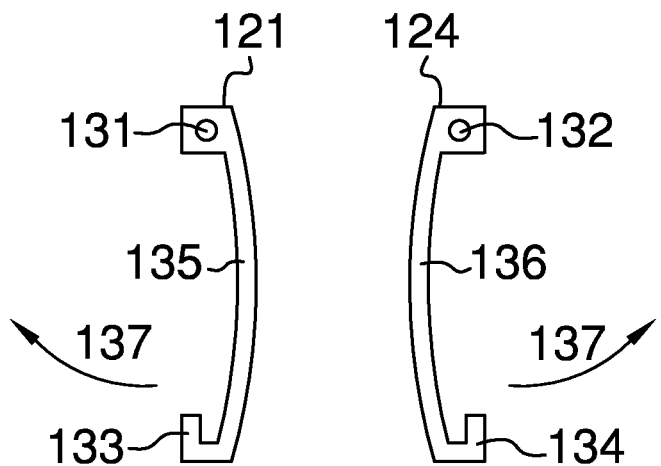
FIG. 5 is a detail view of an embodiment of the disclosure.

Detailed reference will now be made to a first potential embodiment of the disclosure, which is illustrated in FIGS. 1 through 5. The coupling having hammer ears 100 (hereinafter invention) comprises the female connection 103 of a cam and groove coupling 101 and a collar 104.

The female connection 103 is attached to a hose 141. The hose 141 and female connection 103 are used to temporarily attach to a designated connecting pipe 142 in a permanently established piping network.

The female connection 103 further comprises a flow shaft 113, a flow channel 114. The flow shaft 113 is a cylindrical pipe with an inner diameter 144 that is smaller than the outer diameter 145 of the hose 141. The flow shaft 113 is further defined with an open end 115 and a hose end 116. The open end 115 of the flow shaft 113 is used to connect to the male connection 102 of the cam and groove coupling 101. The hose end 116 of the flow shaft 113 is inserted into the hose 141 and is secured into position using one or more ring clamps 143. The hollow chamber within the flow shaft 113 is referred to as the flow channel 114. The purpose of the flow channel 114 is to allow liquid to flow from the hose 141 through the flow channel 114 of the flow shaft 113 into the designated connecting pipe 142 of the piping network.

The purpose of the collar 104 is to secure the female connection 103 to the male connection 102 that is attached to the designated connecting pipe 142. The collar 104 is attached to the open end 115 of the flow shaft 113. The collar 104 further comprises a flange 117, a one or more hammer ears 118, a first locking clamp 111, and a second locking clamp 112.

The flange 117 is a ring with a hollow circular center. The diameter of the hollow circular center is the same as the inner diameter 144 of the flow shaft 113. The center point of the flange 117 is aligned with the flow shaft 113. The flange 117 acts as a rim that projects away from the centerline of the flow shaft 113 and provides a support surface against which the male connection 102 can be placed.

Attached along the outer circumference of the flange 117 is the first locking clamp 111. The purpose of the first locking clamp 111 is to securely attach the female connection 103 to the male connection 102 once the cam and groove coupling 101 is completed. The first locking clamp 111 further comprises a first notch 119, a first bar 120, and a first clamp arm 121. The first notch 119 is an indentation that is cut into the outer circumference of the flange 117 to form a space. The first bar 120 is further defined with a first end 125 and a second end 126. The first end 125 of the first bar 120 is attached to the first notch surface 129 formed when the first notch 119 was created. The second end 126 of the first bar 120 is attached to the first notch surface 129 formed when the first notch 119 was created. The first bar 120 is used to attach the first clamp arm 121 to the flange 117. This is done by inserting the first bar 120 through a first clamp hole 131 that is formed in the first clamp arm 121 before affixing the first bar 120 to the first notch surface 129. The first bar 120 then acts as a pivot point around which the first clamp arm 121 can rotate 137. The first clamp arm 121 further comprises a first clamp latch 133 and a first clamp bar 135. The first clamp latch 133 is a device that clamps onto the male connection 102 and holds the female connection 103 and male connection 102 together. The first clamp bar 135 is the piece of metal that connects the first clamp latch 133 to the first clamp hole 131.

Attached along the outer circumference of the flange 117 is the second locking clamp 112. The second locking clamp 112 is located along the outer circumference of the flange 117 at a location distal from the first locking clamp 111. The purpose of the second locking clamp 112 is to securely attach the female connection 103 to the male connection 102 once the cam and groove coupling 101 is completed. The second locking clamp 112 further comprises a second notch 122, a second bar 123, and a second clamp arm 124. The second notch 122 is an indentation that is cut into the outer circumference of the flange 117 to form a space. The second bar 123 is further defined with a third end 127 and a fourth end 128. The third end 127 of the second bar 123 is attached to the second notch surface 130 formed when the second notch 122 was created. The fourth end 128 of the second bar 123 is attached to the second notch surface 130 formed when the second notch 122 was created. The second bar 123 is used to attach the second clamp arm 124 to the flange 117. This is done by inserting the second bar 123 through a second clamp hole 132 that is formed in the second clamp arm 124 before affixing the second bar 123 to the second notch surface 130. The second bar 123 then acts as a pivot point around which the second clamp arm 124 can rotate 137. The second clamp arm 124 further comprises a second clamp latch 134 and a second clamp bar 136. The second clamp latch 134 is a device that clamps onto the male connection 102 and holds the female connection 103 and male connection 102 together. The second clamp bar 136 is the piece of metal that connects the second clamp latch 134 to the second clamp hole 132.

Each of the one or more hammer ears 118 project away from the flange 117 in a direction radial to the centerline of the flow shaft 113. Each of the one or more hammer ears 118 is formed in the shape of a semi-oval or semicircle such that the circumference of the semi-oval or semicircle extends beyond the outer diameter of the male connection 102. This allows a user to strike each of the one or more hammer ears 118 in two directions. Striking a hammer ear selected from the one or more hammer ears 118 in a direction from the female connection 103 towards the male connection 102 will act to secure the female connection 103 to the male connection 102. Striking a hammer ear selected from the one or more hammer ears 118 in a direction from the male connection 102 towards the female connection 103 will act to disconnect the male connection 102 from the female connection 103.

In the first potential embodiment of the invention 100, the one or more hammer ears 118 further comprises a first hammer ear 138 and a second hammer ear 139. The first hammer ear 138 is located in a position along the circumference of the flange 117 equidistant from the location of the first locking clamp 111 and the location of the second locking clamp 112. The second hammer ear 139 is located in a position along the circumference of the flange 117 distal from the first hammer ear 138.

To use the invention 100 the female connection 103 is placed over male connection 102. A hammer 146 is then used to strike the one of the one or more hammer ears 118 to secure the female connection 103 into the male connection 102. Once in position, the first clamp arm 121 and the second clamp arm 124 are positioned over the male connection 102 to hold the cam and groove coupling 101 in position. The appropriate valves can then be opened to transfer the material. Once the transfer of material is completed, the appropriate valves are closed, the first clamp arm 121 and the second clamp arm 124 are released and a hammer 146 is then used to strike one of the one of the one or more hammer ears 118 to disconnect the female connection 103 from the male connection 102.

The female connection 103 and the collar 104 may be formed of metal or plastic. Appropriate metals include, but are not limited to, copper, aluminum or stainless steel. Appropriate plastic includes, but are not limited to, polyvinylchloride.

The following definitions were used in this disclosure.

Hose: As used in this disclosure, a hose is a flexible hollow cylindrical device that is used for transporting liquids and gasses. When referring to a hose in this disclosure, the terms inner diameter 144 and outer diameter 145 are used as they would be used by those skilled in the plumbing arts.

Pipe: As used in this disclosure, a pipe is a hollow cylindrical device that is used for transporting liquids and gasses. When referring to a pipe in this disclosure, the terms inner diameter 144 and outer diameter 145 are used as they would be used by those skilled in the plumbing arts. The line that connects the center of the first base of the cylinder to the center of the second base of the cylinder is referred to as the centerline of the pipe. When two pipes or a pipe and another object share the same centerline, or if the center point of the other object lies on the center line, they are said to be aligned.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A female coupling comprising:
a female connection and a collar;
wherein the female connection is used with a male connection of a cam and groove coupling;
wherein the collar is formed with one or more hammer ears;
wherein each of the one or more hammer ears is adapted to receive blows from a hammer;
wherein the female connection further comprises a flow shaft and flow channel;
wherein the flow shaft is adapted for use with a hose;
wherein an outer diameter of the flow shaft is smaller than an inner diameter of the hose;
wherein the flow shaft is further defined with an open end and a hose end;
wherein the hose end of the flow shaft is inserted into the hose;
wherein the flow shaft is a cylindrical pipe;
wherein the collar secures the female connection to the male connection of a cam and groove coupling;
wherein the collar is attached to the open end of the flow shaft;
wherein the collar further comprises a flange having a terminal end face, the one or more hammer ears being located at the terminal end face of the flange, a first locking clamp, and a second locking clamp;
wherein the flange is a ring with a hollow circular center;
wherein a diameter of the hollow circular center of the flange is the same as an inner diameter of the flow shaft;
wherein a center point of the flange is aligned with the flow shaft;
wherein the flange further comprises a rim that projects away from the centerline of the flow shaft;
wherein the first locking clamp is attached along an outer circumference of the flange;
wherein the second locking clamp is attached to the outer circumference of the flange;
wherein the first locking clamp attaches the female connection to the male connection of the cam and groove coupling;
wherein the second locking clamp attaches the female connection to the male connection of the cam and groove coupling;
wherein the first locking clamp further comprises a first notch, a first bar, and a first clamp arm;
wherein the second locking clamp further comprises a second notch, a second bar, and a second clamp arm;
wherein the first notch is an indentation formed into the outer circumference at the terminal end face of the flange;
wherein the first bar attaches the first clamp arm to the flange;
wherein the first bar is further defined with a first end and a second end;
wherein the first end of the first bar is attached to a first notch surface formed when the first notch was formed;
wherein the second end of the first bar is attached to the first notch surface;
wherein the first bar is a pivot point around which the first clamp arm can rotate;
wherein the second notch is an indentation formed into the outer circumference at the terminal end face of the flange;
wherein the second bar attaches the second clamp arm to the flange;
wherein the second bar is further defined with a third end and a fourth end;
wherein the third end of the second bar is attached to a second notch surface formed when the second notch was formed;
wherein the fourth end of the second bar is attached to the second notch surface; and
wherein the second bar is a pivot point around which the second clamp arm can rotate.

2. The female coupling according to claim 1 wherein each of the one or more hammer ears projects away from the flange.

3. The female coupling according to claim 2 wherein each of the one or more hammer ears projects in a direction radial to the centerline of the flow shaft.

4. The female coupling according to claim 3 wherein each of the one or more hammer ears is formed in the shape of a semi-oval such that a circumference of the semi-oval extends beyond an outer diameter of the male connection.

5. The female coupling according to claim 4 wherein the one or more hammer ears further comprises a first hammer ear and a second hammer ear.

6. The female coupling according to claim 1 wherein
each of the one or more hammer ears projects away from the flange;
wherein each of the one or more hammer ears is formed in the shape of a semi-oval such that a circumference of the semi-oval extends beyond an outer diameter of the male connection;
wherein any selected hammer ear from the one or more hammer ears is equidistant from the remaining hammer ears from the one or more hammer ears.

7. The female coupling according to claim 6 wherein the one or more hammer ears further comprises a first hammer ear and a second hammer ear.

* * * * *